United States Patent
Moncomble et al.

(10) Patent No.: US 10,593,366 B2
(45) Date of Patent: Mar. 17, 2020

(54) SUBSTITUTION METHOD AND DEVICE FOR REPLACING A PART OF A VIDEO SEQUENCE

(71) Applicant: Orange, Paris (FR)

(72) Inventors: Ghislain Moncomble, Plestin les Greves (FR); Patrick Rondet, Lannion (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/181,315

(22) Filed: Jun. 13, 2016

(65) Prior Publication Data

US 2016/0372154 A1 Dec. 22, 2016

(30) Foreign Application Priority Data

Jun. 18, 2015 (FR) ...................... 15 55577

(51) Int. Cl.

| | |
|---|---|
| *G11B 27/034* | (2006.01) |
| *H04N 21/234* | (2011.01) |
| *H04N 21/233* | (2011.01) |
| *H04N 21/439* | (2011.01) |
| *H04N 21/858* | (2011.01) |
| *H04N 21/8549* | (2011.01) |
| *H04N 21/845* | (2011.01) |
| *H04N 21/44* | (2011.01) |
| *G10L 15/18* | (2013.01) |
| *G10L 17/00* | (2013.01) |
| *G10L 25/48* | (2013.01) |
| *G11B 27/28* | (2006.01) |

(52) U.S. Cl.
CPC ........ *G11B 27/034* (2013.01); *G10L 15/1815* (2013.01); *G10L 17/005* (2013.01); *G10L 25/48* (2013.01); *G11B 27/28* (2013.01); *H04N 21/233* (2013.01); *H04N 21/23424* (2013.01); *H04N 21/4394* (2013.01); *H04N 21/44016* (2013.01); *H04N 21/8456* (2013.01); *H04N 21/8549* (2013.01); *H04N 21/8586* (2013.01)

(58) Field of Classification Search
CPC .. G11B 27/034; G10L 15/1815; H04N 21/233
See application file for complete search history.

(56) References Cited

U.S. PATENT DOCUMENTS 9,014,540 B1 * 4/2015 Cholas ................ H04N 21/258
386/240
2004/0254958 A1 * 12/2004 Volk .................... G06F 3/0484
(Continued)

FOREIGN PATENT DOCUMENTS

| CN | 104065977 A | 9/2014 |
| EP | 2575341 A | 4/2013 |
| FR | 2811111 A | 1/2002 |

OTHER PUBLICATIONS

The French Search Report from the FR1555577 application.

*Primary Examiner* — Girumsew Wendmagegn
(74) *Attorney, Agent, or Firm* — Haverstock & Owens LLP

(57) ABSTRACT

The invention relates to a substitution method for replacing, in an audiovisual content, a part of the content defined by a time range with an audiovisual substitution sequence, the method being characterized in that the substitution sequence is representative of the part to be replaced. The invention also concerns a device and a terminal implementing the invention.

9 Claims, 3 Drawing Sheets

(56) References Cited

U.S. PATENT DOCUMENTS

| | | | |
|---|---|---|---|
| 2008/0162597 A1* | 7/2008 | Tysowski | G06F 17/30581 |
| 2008/0193016 A1* | 8/2008 | Lim | G06F 17/30787 |
| | | | 382/190 |
| 2009/0154806 A1* | 6/2009 | Chang | G06F 17/30781 |
| | | | 382/173 |
| 2009/0158323 A1* | 6/2009 | Bober | G11B 27/105 |
| | | | 725/37 |
| 2010/0332560 A1* | 12/2010 | Gerbasi, III | G11B 27/034 |
| | | | 707/812 |
| 2012/0236201 A1* | 9/2012 | Larsen | H04N 21/235 |
| | | | 348/468 |
| 2014/0278308 A1 | 9/2014 | Liu et al. | |
| 2014/0310342 A1 | 10/2014 | Gouesbet | |
| 2015/0332732 A1* | 11/2015 | Gilson | G11B 27/036 |
| | | | 386/240 |
| 2015/0363156 A1* | 12/2015 | Cudak | G06F 3/165 |
| | | | 700/94 |
| 2016/0227261 A1* | 8/2016 | Neumeier | H04N 21/23439 |

* cited by examiner

SUBSTITUTION METHOD AND DEVICE FOR REPLACING A PART OF A VIDEO SEQUENCE

TECHNICAL FIELD

The present invention relates to the field of digital audio-visual services and in particular concerns an automated video editing method for online training and presentations.

PRIOR ART

The field of distance education has undergone significant transformations since the Internet has become widely accessible. Distance education, or distance learning, refers to all distance education facilities, whether they be correspondence courses, MOOCs (Massive Open Online Courses) or online training. It applies to both continuing education and initial training, both on an individual and collective basis. These training arrangements increasingly use digital tools and means of the Internet.

Although distance education can respond to situations of geographic remoteness with the desired training, it is also useful in situations of disability, time constraint or financial constraint. This type of training involves a very large audience made up of pupils, students, persons in a break in employment or persons in active employment.

The flexible and open nature of these training arrangements offers learners the possibility to independently manage the time devoted to learning, and leaves them free to enter or leave the facility. Furthermore, training is referred to as "open" insofar as it is easily physically accessible. Lastly, "open" and "flexible" training is supposed to be accessible to the largest numbers and to any person wishing to follow a course, unlike education in a standard academic curriculum. Tutoring, learning and traditional classroom lesson sessions can be combined therewith.

MOOCs are online courses that are open to everyone. This type of education means that courses run by the best schools and universities in the world are made accessible to everyone, thus profoundly transforming access to knowledge and learning in most fields.

The success of MOOCs is related to their very simple mode of operation: the teachers give lectures which are filmed before being broadcast via the Internet. The courses are most often divided up into sections of short duration and associated with a discussion forum allowing students to obtain clarifications, to go deeper into a subject or to pose questions. When courses are broadcast live, or during question-and-answer sessions organized after a class, the teachers can respond live to questions from students. This interactivity between students and teachers is a powerful feature of MOOCs and contributes greatly to their success.

MOOCs are recorded and accessible on dedicated sites and on university or school sites via a simple Internet browser. Thus, the courses can be consulted from anywhere in the world and at any time.

The effectiveness of a lesson, whether it be face-to-face or a MOOC, depends for a large part on the capability of the teacher to grab the attention of his/her audience. In the case of MOOCs, particular attention must be given to video production quality and to the frequency and quality of exchanges between teachers and students.

Although interactivity is an important element in the pedagogical effectiveness of an online class such as a MOOC, multiple contributions in a class can prove to be counter-productive. Since the class is being followed by a large audience, contributions can be necessary for some to understand correctly, but can prove to be a nuisance for others. Thus, it can be advantageous, when publishing the video of a class online, to remove from the video the parts corresponding to contributions such as questions from students and answers from the teacher, while leaving these sequences accessible to students who wish to consult them.

Publishing such classes online often requires prior video editing. For example, when several cameras are used, intervention by a technician may be necessary to select the shots. Since there is a cost to this editing, and since the courses are free-of-charge, it is appropriate to automate this editing step as much as possible. To that end, various technical solutions exist. For example, there are techniques based on the detection of voice activity for switching from one camera to another depending on the person who is speaking. Other technical solutions provide for automatically framing a face or even following a person as he/she moves. Such technical arrangements make it possible to reduce the production cost of the video while avoiding having production facilities or performing editing before a class is published online.

In some cases, the editing step cannot be fully automated using existing techniques. In particular, intervention by a technician remains necessary to pick out the parts of the class corresponding to contributions and to extract them from the main video.

Despite all this, techniques are known in the audiovisual field, for example for detecting the start and end of a promotional sequence in order to remove it from a content. The range corresponding to the sequence can hence be determined by detecting a change of sound level or of a particular image in the video stream. However, these techniques are not satisfactory when they are used within the framework of a MOOC. Specifically, the start and end transitions of a contribution during a class are much more vague and cannot be detected by such techniques. Furthermore, within the framework of a MOOC, it is important to keep a note of the moment of the contribution and its content.

Thus, there is a need for a technical solution for automatically editing from a video such as a video of a MOOC type online class, and in particular for removing certain passages while preserving information in the video content about the removed passages.

SUMMARY OF THE INVENTION

To this end, the invention concerns a substitution method for replacing, in an audiovisual content, a part of the content defined by a time range with an audiovisual substitution sequence, the method being notable in that the substitution sequence is representative of the part to be replaced.

Thus, it is possible to extract a part of a video content, such as for example a part corresponding to a contribution by a student during a MOOC type class, and to replace this part with another shorter sequence consisting for example of a transition between the part preceding the extracted part and the part following the extracted part. This transition sequence is such that it is representative of the replaced part. For example, the transition sequence can include a message composed of keywords relating to the replaced part, said message being able for example to be vocalized during said transition sequence, or even to be included in at least one image generated for this purpose, which image is displayed during said transition. Thus, a user viewing the video is alerted that a sequence has been extracted and has available information regarding the content that has been replaced.

According to a particular implementation, the method is such that the substitution sequence is generated from a semantic analysis of the part of the content defined by the time range.

The semantic analysis of the replaced sequence provides for extracting concepts from it which are used to generate a substitution sequence which is representative of the extracted sequence.

According to a particular implementation, the method is such that the start and end instants of the time range are determined by the detection of a first and a second particular event in the audiovisual stream.

The time range corresponding to the part to be replaced is identified automatically by detection of a start event and of an end event. Thus, intervention by a technician is not necessary to determine the part or parts to be replaced in the video content. A video sequence corresponding, for example, to an online class can thus be published online more rapidly and at lower cost.

According to a particular implementation, the method is such that the extracted part is stored and the replacement sequence contains an interactive link suitable for triggering the restitution of the extracted part.

When a part of an audiovisual content is replaced, that part is stored so as to be able to be consulted if necessary. The replacement sequence can then include a link to this part. Thus, when a user views the content, he/she can easily consult the replaced sequence if desired. For example, the replacement sequence can comprise an interactive link, such as a hypertext link, pointing to the storage location of the replaced part.

According to a particular implementation, the method is such that the audiovisual content resulting from the substitution comprises an index indicating the start of the replacement sequence.

When a sequence is replaced, in an audiovisual content, its location is indexed on the audiovisual content from which the sequence is extracted. Thus, a user can access a list of replaced sequences in the content. The index can also serve to include a mark corresponding to the replaced parts on a timeline displaying in a conventional manner the progress of the playback. A user can thus easily pick out the replaced time ranges in the content and access them by moving a playback cursor to them.

According to a particular embodiment, the method is such that at least one of the first and second particular events is identified by the recognition of at least one keyword in an audio component of the audiovisual content.

The method provides for automatically selecting a sequence to be replaced on the basis of one or more keywords detected in an audio component of the content. For example, the start of a question/answer type contribution between a student and a teacher in a MOOC type class can be detected when the teacher utters an expression of the type: "you can ask your question". Such an expression can be detected by conventional voice recognition techniques. Likewise, the end of a contribution can be detected by the recognition of an expression of the type: "let us resume the lesson". The teacher can thus control the start and end of the sequences to be replaced by uttering appropriate words or expressions at the right time.

According to a particular embodiment, the method is such that at least one of the first and second particular events is identified by a change of speaker in an audio component of the audiovisual content.

By detecting a change of speaker, the method can detect the start of a sequence to be replaced. For example, in a MOOC type class, the method can determine that a student has taken over the speaking by known voice analysis techniques, in order to determine the start of a time range corresponding to a sequence to be replaced. The method thus provides for automatically determining the start and/or the end of a time range to be replaced.

According to a particular embodiment, the method is such that at least one of the first and second particular events is identified by a change of audio source in an audio component of the audiovisual content.

Thus, the method provides for detecting the start or the end of a time range according to the audio source used. For example, in a lecture theatre, the seats of which are equipped with individual microphones, the method can determine that an individual has taken over the speaking when a microphone other than that of the teacher is activated. The method thus provides for automatically determining the start and/or the end of a time range to be replaced. This embodiment is particularly appropriate when at least a part of the video editing is performed during the initial filming of the audiovisual document.

According to a particular embodiment, the method is such that at least one of the first and second particular events is identified by image analysis in a video component of the audiovisual content.

The start and/or the end of the time range corresponding to a part of the content to be replaced is determined by an analysis of the images of the video component of the audiovisual content. For example, the invention can implement a gesture recognition algorithm to detect for example a student in an audience of students raising his/her hand in order to request to speak, or even a facial recognition of the speaker to distinguish between the face of the presenter and other faces including the students. The method thus provides for automatically detecting the start of a part of the content to be replaced.

According to a particular implementation, the method is such that the substitution sequence is representative of the extracted sequence in that it contains a summary of the extracted part.

The substitution sequence is composed following a semantic analysis of the part to be replaced, enabling the generation of a summary. For example, the audio component of the content is subjected to a speech recognition algorithm in order to determine keywords representative of the substituted content. These keywords can be integrated in the substitution sequence in such a way as to give overview information about the replaced part. The summary can also consist of a repeat in text form of a question posed by a student. The summary can be integrated in the replacement video sequence, for example in the form of a vocalized message during said transition sequence or in the form of text included in at least one image of the sequence generated for this purpose. Thus, a student viewing an online class can immediately gauge how beneficial a contribution may be before deciding whether or not to view it.

The invention relates also to a substitution device for replacing, in an audiovisual content, a part of the content defined by a time range with an audiovisual substitution sequence, the device including a processing unit suitable for generating a substitution sequence representative of the part of said content.

In a particular embodiment, the device comprises:
A module for detecting the start and end instants of the time range by detection of a first and a second particular event in the audiovisual stream, A module for extracting the part of the audiovisual content contained between the start and the end of the time range, A module for semantic analysis of the extracted part and for generating a substitution sequence from the result of the analysis, A module for inserting the substitution sequence in place of the extracted part.

The invention also concerns a terminal including a substitution device as described above.

The invention also concerns a computer program containing the instructions for the execution of the substitution method, when the program is executed by a processor.

The invention also concerns an information medium readable by a processor on which there is recorded a computer program comprising instructions for the execution of the steps of the substitution method.

The various embodiments or features of implementation mentioned above can be added independently or in combination with one another to the steps of the substitution method.

The terminals, devices, programs and information media exhibit at least advantages similar to those provided by the substitution method described above.

LIST OF FIGURES

Other features and advantages of the invention will become clearer upon reading the following description of a particular embodiment, given by way of simple illustrative and nonlimiting example, and from the appended drawings in which:

FIGS. 1a, 1b and 1c schematically represent a video sequence in which a part is replaced according to a particular embodiment.

DETAILED DESCRIPTION

The invention will now be described by taking the example of a lesson run by a teacher in front of an audience of students, the lesson being filmed in order to be broadcast online in MOOC form. The invention can however be applied to other contexts. For example, the invention can be used to replace a promotional sequence detected in an audiovisual program by an information screen setting out in list form the various advertisements contained in the original sequence, the information screen additionally being able to contain links to the various advertisements, or even in a product presentation video.

Figure 1A:
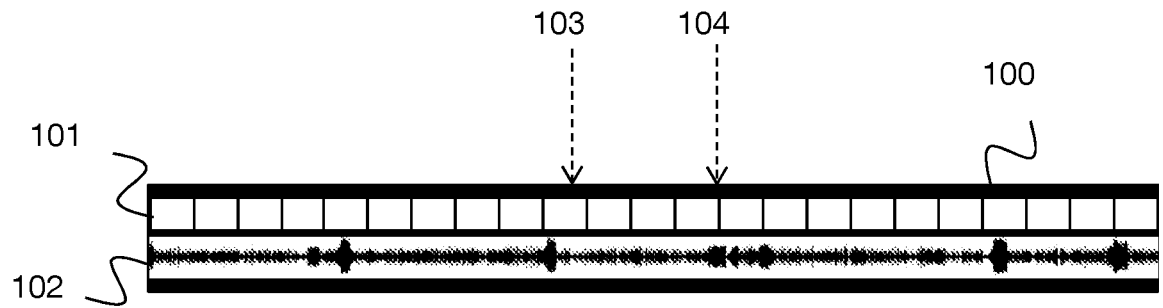

FIG. 1a represents a video sequence 100 recorded during a MOOC type class run by a teacher in front of an audience of students. In this example, the video comprises a video component 101 and an audio component 102.

Figure 2:
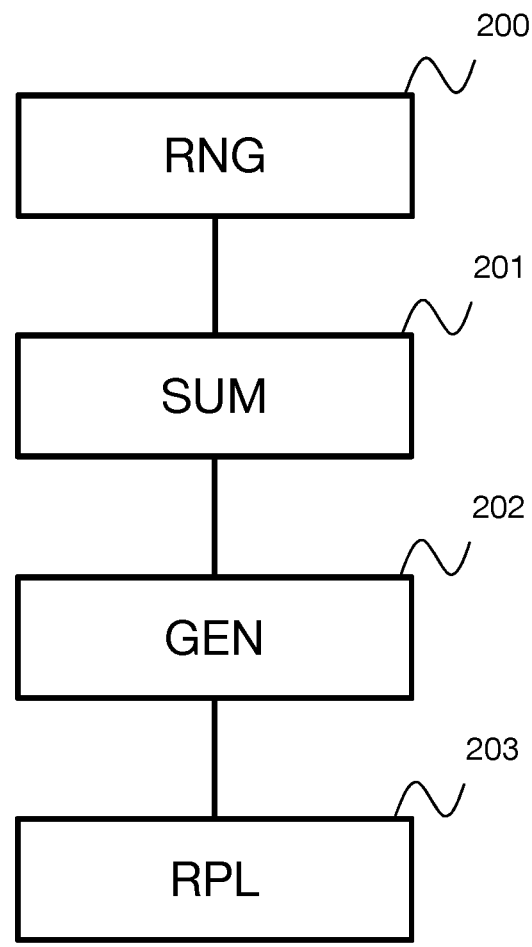
FIG. 2 illustrates the various steps of the substitution method according to a particular embodiment of the invention.

During a first step 200 represented in FIG. 2, the audiovisual content is analysed so as to detect a first and a second particular events. These first and second particular events form the start and the end of a time range corresponding to a part of the content to be replaced. In this example, the analysis aims to determine a time range corresponding to a contribution by a student during the lesson. This analysis can be implemented according to various techniques.

According to a first particular embodiment, the audio component is analysed so as to pick out one or more keywords indicating the start or the end of a contribution. To that end, the method can use a suitable voice recognition algorithm. Conventionally, the voice recognition algorithm can be trained beforehand to recognize particular keywords. For example, the algorithm can be trained from a corpus of users uttering various keywords. Secondly, a filter suitable for filtering voice frequencies and suppressing background noise can be applied to the audio component of the sequence. Lastly, the audio component is presented as input to the algorithm in order to detect keywords indicating the start and the end of a contribution. Such keywords can for example be uttered by the teacher when he/she hands over the speaking to a student and when he/she takes over again to continue the class. It is thus possible to delimit a part of the content corresponding to an interruption of the class.

According to a particular implementation, the audio component is analysed so as to pick out a change of speaker. Such an arrangement provides for detecting, for example, an instant at which an individual other than the teacher takes over the speaking. To that end, a conventional algorithm suitable for recognizing the timbre of the voice can be used. This algorithm can be trained beforehand to recognize the voice of the teacher. Thus, when the audio component of the sequence is presented as input to the algorithm, the latter can detect an instant at which an individual other than the teacher takes over the speaking. Such an arrangement provides for detecting a start instant of a lesson interruption.

According to a particular embodiment, the audio component of the sequence is analysed so as to detect a change of audio source characteristic of a change of speaker. For example when, during the fitting-out of a lecture theatre, a microphone is provided for the teacher and at least one microphone for the students, the method interprets a change of microphone as a change of speaker, thereby indicating the start and/or the end of a contribution. To that end, the method can implement an algorithm suitable for recognizing a characteristic signature of a particular microphone in the audio signal. To that end, the algorithm can undergo training beforehand from audio signals captured from various microphones in order to determine a characteristic signature for each of the microphones. For example, the signature can comprise the frequency bandwidth captured by a microphone, a gain or a noise level specific to the microphone. It is thus possible, following analysis of the audio component by such an algorithm, to determine an instant in the sequence corresponding to the activation or deactivation of a particular microphone. Such an arrangement provides for detecting a start or end instant of an interruption of the lesson.

According to a particular embodiment, at least one event marking the start or the end of a time range corresponding to a part of the sequence to be replaced is determined by an analysis of the image. For example, the image analysis can consist in searching for a change of shot, a change of camera or even a particular gesture or a particular face in the sequence. To that end, the method can implement a movement characterization algorithm in order to detect a particular gesture performed, for example, by a student or a teacher participating in a MOOC type class. For example, the movement characterization algorithm can determine that a student is requesting to speak by raising his/her hand in the audience. To that end, a video sequence showing the audience during a class can be presented as input to the algorithm such that an image analysis is performed. At the end of this analysis, the algorithm determines various time ranges corresponding to interruptions of the lesson.

According to a particular embodiment, the various analysis methods described above can be combined so as to use, for example, an analysis of the video to detect the start or the end of a time range corresponding to a sequence to be replaced, and an analysis of the audio component to detect its end.

Following this analysis, a first event 103 and a second event 104 can be detected in the sequence 100. With these two events, a time range located between the event 103 and 104 can be defined, corresponding to a part of the sequence to be replaced.

Figure 1B:
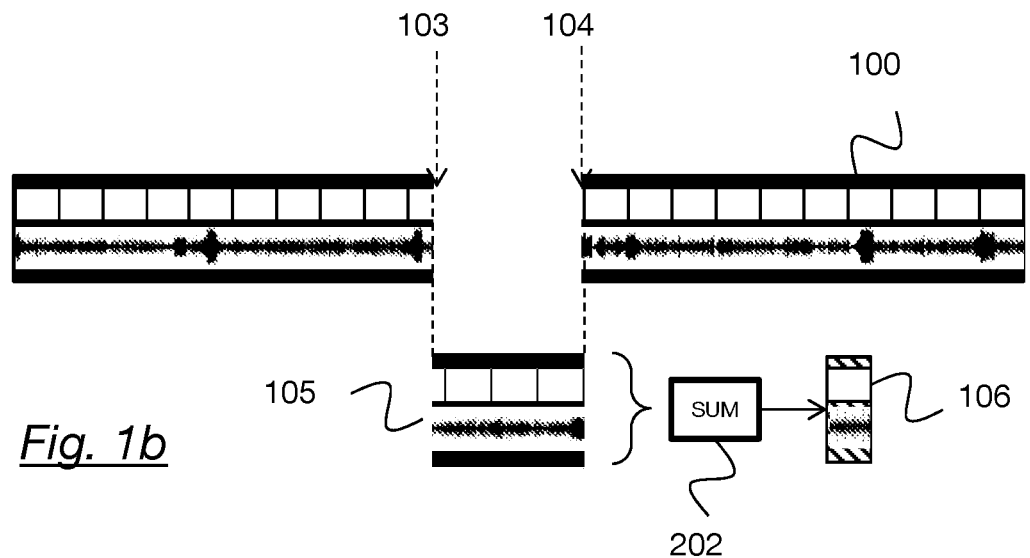

FIG. 1b illustrates the sequence 100 from which a part 105, corresponding to the time range defined by the events 103 and 104, has been extracted. The part 105 corresponds for example to the contribution by a student during a lesson, followed by a response from the teacher. This part is analysed at step 201 illustrated in FIG. 2. This analysis is for example carried out by a voice recognition algorithm working on the audio component of the part 105 after the sequence is extracted and a denoising filter is applied, for example. The algorithm implemented is suitable for producing a list of keywords representative of the contribution by the student. To that end, the step comprises for example the implementation of a speech-to-text (STT) conversion algorithm so as to obtain the text of the contribution. From this text, a second algorithm can for example produce a summary of the contribution by taking, for example, key phrases, the question by the student and/or the answer from the teacher. Such algorithms are known to those skilled in the art and are not explored here in more detail.

From this analysis, a replacement sequence 106 representative of the sequence 105 is generated at step 202. For example, a representative sequence can be generated by the video keying of keywords identified at step 201 or of a summary. The duration of the sequence generated can be different from the duration of the sequence to be replaced. For example, the sequence generated can be a short sequence containing a message indicating that a contribution has taken place.

According to a particular implementation, "text mining" software is applied to the text of the contribution which text is obtained via a voice recognition, in order to define a relevance of the interruption. Such algorithms are known to those skilled in the art and are not explored here in detail.

From this analysis, a replacement sequence 106 can be generated at step 202 as a replacement of the sequence 105, but without content representative of said sequence 105 if the content has not been deemed relevant. For example, the sequence 106 is hence a simple shot transition.

According to a particular embodiment, a series of replacement sequences 106 can be generated and positioned successively at step 202 as a replacement of the sequence 105, for the case in which a series of distinct representative items of content of said sequence 105 have been identified. For example, the generated sequence 106 contains a succession of messages each indicating that a contribution has taken place.

As a variant, the sequence 106 contains only one replacement message, said message indicating that several distinct contributions have taken place.

According to a particular implementation, the replacement sequence includes at least one interactive link 107 providing access to the replaced sequence, such as for example a hypertext link. Where several parts are replaced by a single sequence, the sequence can include several interactive links providing access to the various replaced parts. Such hypertext links, when they are selected by a user, can trigger the playback of a replaced part stored in a storage space. Thus, a user can view the lesson without it being interrupted by contributions and access the replaced sequence if needed by a simple interaction on the replacement sequence or by using the index.

Figure 1C:
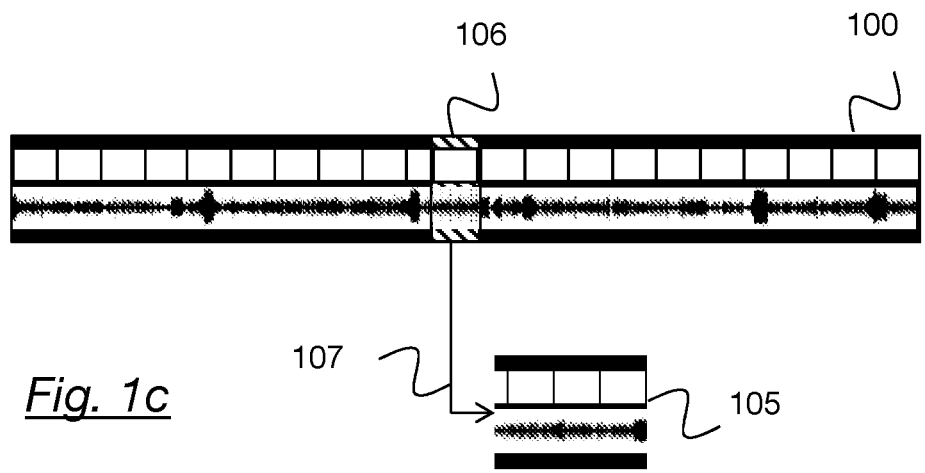

FIG. 1c represents the initial video sequence 100 in which the part 105 has been replaced by the generated sequence 106. This replacement is performed at step 203 of the substitution method illustrated in FIG. 2. The replacement can be performed using conventional video editing techniques. According to a particular implementation, the audiovisual content resulting from the substitution contains an index indicating the start of the replacement sequence. For example, timestamp information relating to various replaced parts in a video sequence can be listed in an index in such a way that a user can immediately have access to one of the replaced sequences. For example, when the video is viewed using a suitable multimedia player, the various entries of the index can appear in the form of visual indexes integrated in a playback progress bar.

Figure 3:
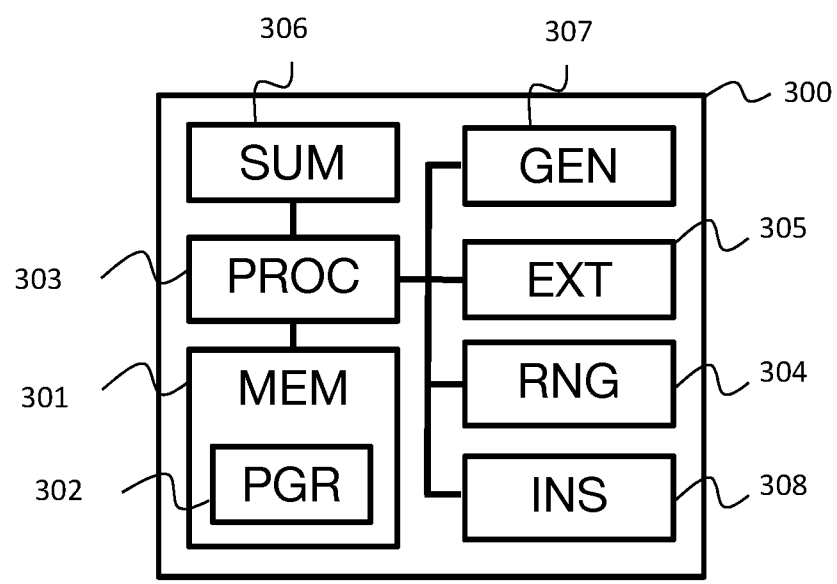
FIG. 3 represents in a simplified manner a substitution device according to a particular embodiment of the invention.

FIG. 3 illustrates a device 300 implementing the substitution method, according to a particular embodiment of the invention. The device comprises a storage space 301, for example a memory MEM, and a processing unit 303 equipped for example with a processor PROC. The processing unit can be driven by a program 302, for example a computer program PGR, implementing the substitution method as described in the invention with reference to FIG. 2, and notably the steps for determining the start and end instants of a time range by detection of a first and a second particular event in the audiovisual stream, for extracting the part of the audiovisual content contained between the start and the end of the time range, for the semantic analysis of the extracted part and for generating a substitution sequence from the result of the analysis, and for inserting the substitution sequence in place of the extracted part.

Upon initialization, the instructions of the computer program 302 are for example loaded into a RAM (Random Access Memory) memory before being executed by the processor of the processing unit 303. The processor of the processing unit 303 implements the steps of the substitution method according to the instructions of the computer program 302.

To that end, the device comprises, in addition to the memory 301, a processing unit suitable for determining the start and end instants of a time range by detection of a first and a second particular event in the audiovisual stream. Such processing can be performed by a detection module 304 (RNG) implementing for example a gestural characterization algorithm and/or a speech recognition algorithm. The device also comprises a processing unit suitable for extracting the part of the audiovisual content contained between the start and the end of the time range identified by the detection module 304. The extraction can be performed by an extraction module 305 (EXT) implementing a video processing algorithm capable of identifying the video frames and the audio samples contained in the time range in order to extract them from the sequence. The device also includes a processing unit suitable for performing a semantic analysis of the extracted part, such as for example a module 306 (SUM) implementing an algorithm suitable for creating a summary from an audio component of a video. The device also includes a module 307 (GEN) for generating a substitution sequence from the result of the semantic analysis, the module 307 being able to correspond for example to a video processing unit suitable for keying a summary or keywords into a video. Lastly, the device comprises a module 308

(INS) for inserting the substitution sequence in place of the extracted part in the video sequence.

According to a particular embodiment, the device can be integrated in video processing equipment or in a terminal such as a computer.

The invention claimed is:

1. A method for replacing, in an audiovisual content, a part of the content defined by a time range with an audiovisual substitution sequence, wherein the method comprises acts of:

analyzing the part of the content defined by the time range, wherein start and end instants of the time range are identified by recognition of at least one keyword in an audio component of the audiovisual content, generating a substitution audiovisual sequence on the basis of the analyzed part of the content, the substitution sequence comprising at least one image that contains a message composed of representative keywords of the substituted part of said content, replacing, in the audiovisual content, the part of the content defined by the time range by the generated sequence, so that the generated sequence is played back in place of the replaced sequence when playing the audiovisual content, and storing the replaced sequence so that said replaced sequence can be played back by a user interaction on a hypertext link inserted in the substitution sequence, said hypertext link pointing to a storage location of the replaced sequence.

2. The method as claimed in claim 1, wherein the substitution sequence is generated from a semantic analysis of the part of the content defined by the time range.

3. The method as claimed in claim 1, wherein the audiovisual content resulting from the substitution contains an index indicating the start of the substitution sequence.

4. The method as claimed in claim 1, wherein characterized in that the start and end instants of the time range are determined by the detection of a first and a second particular event in the audiovisual stream.

5. The method as claimed in claim 4, wherein at least one of the first and second particular events is identified by the recognition of at least one keyword in an audio component of the audiovisual content.

6. The method as claimed in claim 1, wherein the substitution sequence is representative of the substituted sequence in that it contains a summary of the substituted part.

7. The method as claimed in claim 1, wherein the substitution sequence is representative of the replaced sequence in that it contains a list of keywords representative of the substituted part.

8. A device for replacing, in an audiovisual content, a part of the content defined by a time range with an audiovisual substitution sequence, the device comprising:

a non-transitory computer-readable medium comprising instructions stored thereon; and a processing unit configured by the instructions to perform acts of:

analyzing the part of the content defined by the time range, wherein start and end instants of the time range are identified by recognition of at least one keyword in an audio component of the audiovisual content, generating a substitution audiovisual sequence on the basis of the analyzed part of the content, the substitution sequence is comprising at least one image that contains a message composed of representative keywords of the substituted part of said content, replacing, in the audiovisual content, the part of the content defined by the time range by the generated sequence, so that the generated sequence is played back in place of the replaced sequence when playing the audiovisual content, and storing the replaced sequence so that said replaced sequence can be played back by a user interaction on a hypertext link inserted in the substitution sequence, said hypertext link pointing to a storage location of the replaced sequence.

9. A non-transitory computer readable memory on which there is recorded a computer program comprising instructions for executing, when the instructions are executed by a processor, a method for replacing, in an audiovisual content, a part of the content defined by a time range with an audiovisual substitution sequence, wherein the method comprises acts of:

analyzing the part of the content defined by the time range, wherein start and end instants of the time range are identified by recognition of at least one keyword in an audio component of the audiovisual content, generating a substitution sequence, the substitution sequence comprising at least one image that contains a message composed of representative keywords of the substituted part of said content, replacing the part of the content defined by the time range by the generated sequence, and storing the replaced sequence so that said replaced sequence can be played back by a user interaction on a hypertext link inserted in the substitution sequence, said hypertext link pointing to a storage location of the replaced sequence.

* * * * *